UNITED STATES PATENT OFFICE.

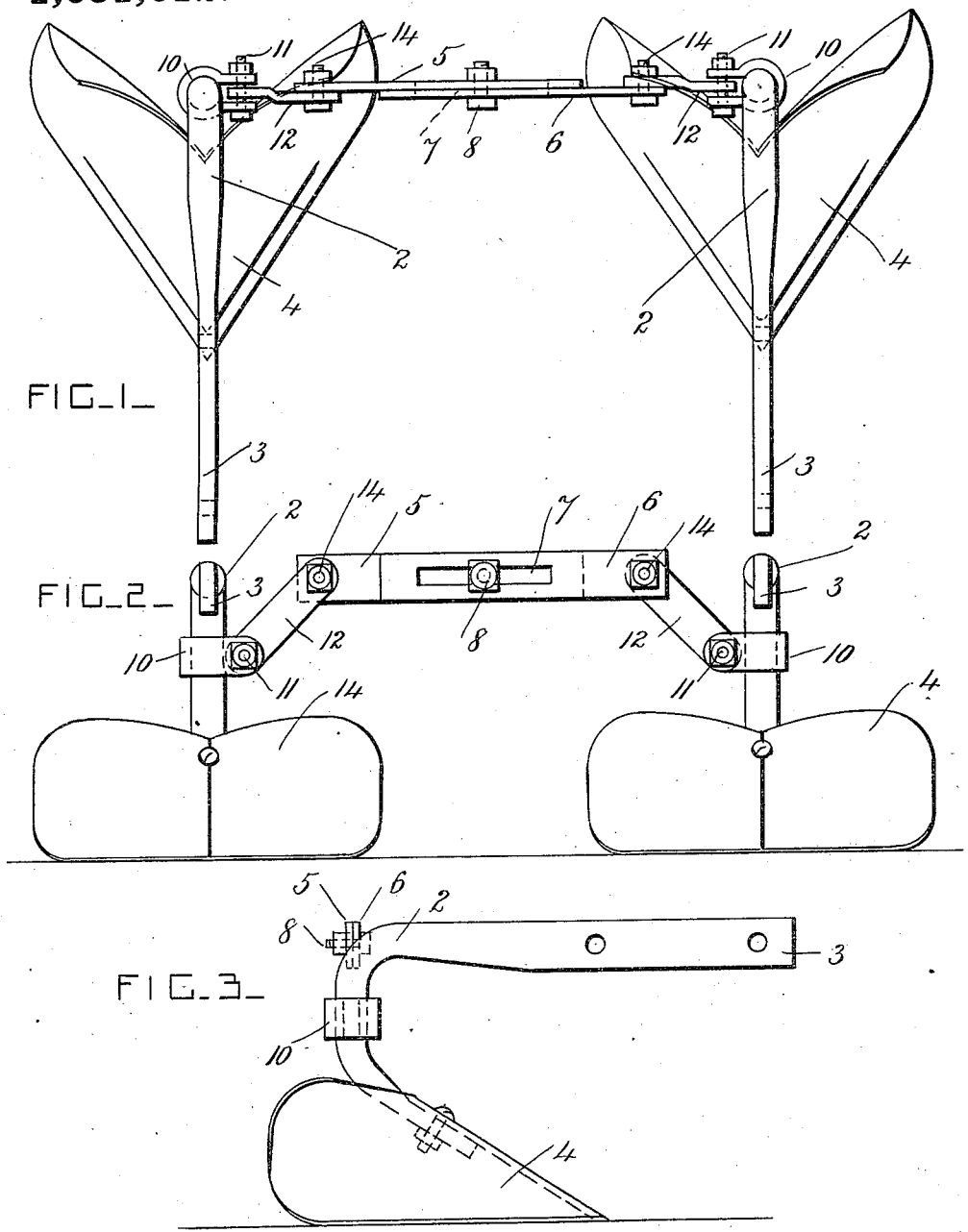

CHARLES T. RUFF, OF BLOOMER, WISCONSIN.

CULTIVATOR.

1,051,012.  Specification of Letters Patent.  Patented Jan. 21, 1913.

Application filed June 27, 1912. Serial No. 706,174.

*To all whom it may concern:*

Be it known that I, CHARLES T. RUFF, a citizen of the United States, residing at Bloomer, in the county of Chippewa and State of Wisconsin, have invented certain new and useful Improvements in Cultivators; and I do hereby declare the following to be a full, clear, and exact description of the invention, such as will enable others skilled in the art to which it appertains to make and use the same.

This invention relates to cultivators for crops which are planted in rows; and it consists of a hilling attachment provided with two shovels which are coupled together as hereinafter fully described and claimed.

In the drawings, Figure 1 is a plan view of the hilling attachment. Fig. 2 is a front view of the same. Fig. 3 is a side view of the attachment.

Two similar curved standards or beams 2 are provided. The front end portions 3 of these standards are arranged substantially horizontal, and are adapted to be attached to the frame of a wheeled cultivator or any other approved means for drawing them along. Hilling shovels 4 are secured to the rear and lower ends of the standards and are of any approved shape for throwing up the dirt on each side of their center lines. A distance-piece formed of two bars 5 and 6 is provided, and these bars have slots 7 arranged longitudinally in them. A clamping bolt 8 is arranged in the slots, and secures the bars together after their positions have been adjusted both longitudinally and pivotally. Loop-shaped clamps 10 are secured upon the necks or vertical portions of the standards, close above the shovels, by means of bolts 11. Short inclined arms 12 are provided and are pivoted on the middle parts of the bolts 11 between the flanges of the clamps. The clamps are tightened on the standards by means of the bolts 11, but the flanges are not clamped upon the arms 12, and the arms 12 are free to move pivotally. The upper ends of the arms 12 are clamped to the outer ends of the distance-piece by bolts 14, and the distance-piece is arranged above the level of the clamps 10 at a height which will clear the tops of the plants. The arms 12 can be adjusted pivotally before the bolts 14 are tightened to clamp them to the distance-piece, so that the height of the distance-piece above the level of the clamps 10 and above the tops of the plants can be regulated. The distance between the standards is adjusted by sliding the bars 5 and 6 longitudinally before tightening up the bolt 8. The distance-piece and its connections guide the shovels and keep them at a prearranged distance apart, and enable one row of plants to be hilled on both sides, and two adjacent rows of plants to be hilled upon one side.

What I claim is:

1. The combination, with two standards, each having a hilling shovel secured to it, of clamps secured to the said standards, and inclined arms pivoted to the said clamps and having their upper end portions coupled together by an adjustable distance-piece which is arranged above the level of the clamps.

2. The combination, with two standards, each having a hilling shovel secured to it, of clamps secured to the said standards and provided with clamping bolts, a distance-piece formed of two bars which are adjustable longitudinally and pivotally, inclined arms pivoted on the said clamping bolts, and clamping bolts connecting the end portions of the distance-piece with the upper end portions of the inclined arms and permitting the height of the distance-piece above the said clamps to be adjusted.

3. The combination, with two similar curved standards having horizontally projecting portions adapted to be attached to a cultivator frame, and hilling shovels secured to the lower end portions of the standards; of clamps secured to the curved middle parts of the standards, links having their outer ends pivoted to the said clamps, a longitudinally adjustable distance-piece, and clamping bolts for securing the distance-piece to the inner end portions of the said links and permitting the distance-piece to be arranged at different levels above the ground.

In testimony whereof I have affixed my signature in the presence of two witnesses.

CHARLES T. RUFF.

Witnesses:
C. L. CHRISTIANSON,
F. E. ANDREWS.

Copies of this patent may be obtained for five cents each, by addressing the "Commissioner of Patents, Washington, D. C."